United States Patent [19]

Wells et al.

[11] Patent Number: 4,997,322

[45] Date of Patent: Mar. 5, 1991

[54] AUTOMOBILE BODY REAMER TOOL

[76] Inventors: Bobby L. Wells, 13415 Dykes Rd.; James R. Harton, 1221 Ada La., both of Little Rock, Ark. 72206

[21] Appl. No.: 456,543

[22] Filed: Dec. 26, 1989

[51] Int. Cl.⁵ .............................................. B23B 51/02
[52] U.S. Cl. ................................. 408/201; 408/211; 408/225; 408/230
[58] Field of Search ............. 408/201, 211, 225, 229, 408/230

[56] References Cited

U.S. PATENT DOCUMENTS

| | | | |
|---|---|---|---|
| 1,561,463 | 11/1925 | de Rochemont | 408/201 |
| 4,167,363 | 9/1979 | Whitesel | 408/230 |
| 4,565,473 | 1/1986 | Hosoi | 408/229 |

FOREIGN PATENT DOCUMENTS

| | | | |
|---|---|---|---|
| 1097104 | 3/1981 | Canada | 408/225 |
| 3316193 | 11/1984 | Fed. Rep. of Germany | 408/225 |
| 71713 | 5/1982 | Japan | 408/225 |
| 201113 | 12/1982 | Japan | 408/201 |
| 1238905 | 6/1986 | U.S.S.R. | 408/230 |
| 2193913 | 2/1988 | United Kingdom | 408/230 |

*Primary Examiner*—Daniel W. Howell

*Attorney, Agent, or Firm*—Stephen D. Carver

[57] ABSTRACT

A body reaming tool for body work which can be used with a conventional drill to remove spot welds during automotive body repairs. A rigid shank coaxial with the longitudinal axis of the tool is fitted within the conventional chuck of a suitable electric hand drill. This increased diameter section is integral with the shank, and it includes an internal bore which coaxially receives twist drill bit used as a pilot. A conventional machine screw is employed in the counterbore section to lock the drill bit in place. The counterbore terminates in a plurality of fluted cutting teeth of a special configuration for quickly removing the metal, while preventing the metal from burring or otherwise interfering with subsequent part separation. Each of the cutting teeth terminate in a leading point which initially engages metal and the body part to be removed. A plurality of spiraling flutes are defined between the cutting teeth. The outermost faces of the teeth are generally planar, and they are defined between upper and lower outer radial edges. Due to the configuration employed, the lead point which is separated from the inner lagging point deflects metal away into the adjacent flutes.

1 Claim, 2 Drawing Sheets

AUTOMOBILE BODY REAMER TOOL

BACKGROUND OF THE INVENTION

The present invention relates generally to metal working tools. More particularly, the present invention is directed to counterboring cutting tools with pilot drills adapted for use in automotive body work which can non-destructively deflect away and remove portions of body spot welds.

In the prior art a plurality of tools adapted to be inserted within a conventional drill for metal working are well known. Many tools include an increased diameter counterbore section mounted to the drill chuck by a concentric, receding shank. It is also known to provide a pilot section extending concentrically away from the counterbore as in U.S. Pat. No. 4,167,363, issued Sept. 11, 1979. However, known tools are deficient when used for removing damaged automotive body parts.

As will be appreciated by those skilled in the automotive repair arts, body parts are typically spot welded along portions bordering the sub-frame and inner sheet metal. When fenders are damaged, for example, it is the usual practice to torch or cut out the damaged piece to expose the intersecting regions which are spot welded together. Then the spot welds must be cut or removed in order to separate the metal pieces prior to making the repairs. Although a variety of techniques have been employed for cutting spot welds, the instant system is designed to work expeditiously with a minimum of damage.

By providing a system wherein the spot weld may be quickly drilled by a pilot drill bit, and then removed by a following counterbore tool, each of the spot welds can be separately drilled out with a minimum of damage to the inner frame and body sections of the automobile. Afterwards the damaged body part may be quickly and easily removed, and the repair part may relatively quickly be installed.

SUMMARY OF THE INVENTION

The present invention comprises a counterboring tool for body work which can be used with a conventional drill to remove spot welds during automotive body repairs.

A rigid shank is coaxial with a longitudinal axis of the tool, and it is adapted to be fitted within the conventional chuck of a suitable electric hand drill. The counterboring section of increased diameter is integral with the shank, and it includes an internal bore which can coaxially receive a conventional twist drill bit used as a pilot. A conventional machine screw is employed in the counterbore section to lock the drill bit in place. The counterbore terminates in a plurality of fluted cutting teeth of a special configuration for quickly removing the metal, while preventing the metal from burring or otherwise interfering with subsequent part separation.

Each of the cutting teeth terminates in a leading point which initially engages metal and the spot weld on the body part or work piece to be removed. A plurality of spiraling flutes are defined between the cutting teeth. These leading points function oppositely from the known taper of standard drill bits and the like. The outermost faces of the teeth are generally planar, and they are defined between upper and lower outer radial edges. Due to the configuration employed, the lead point which is separated from the inner lagging point deflects metal upwardly and away from adjacent metal in the spot weld being drilled and into the adjacent flutes.

When the tool is rotated in a conventional drill, initial penetration of the spot weld is achieved by the pilot drill bit. Subsequently, the rotating counterbore section will encounter the metal, and its outermost angled leading points will first contact the metal causing small fragments to initially radially centrifugally be displaced. The spot weld will be drilled out without ragged edges or burrs. Because of the configuration of the tool minimal damage is caused to the automotive inner structure during repairs.

Thus a broad object of the present invention is to provide a convenient tool for use by automobile body men for spot weld removal.

A similar object of the invention is to provide a rotating tool which can be used with conventional drills for non-destructively removing spot welds.

A related object, therefore, is to aid in the removal of damaged automobile body parts which have been spot welded together.

Another object is to provide a tool of the character described which can cut through as many layers of sheet metal as needed.

Yet another object is to provide a rotary tool of the character described which can easily cut through bent or warped metal.

Also it is an object to provide a tool of the character described which can cut through metal at an angle, and which can cut through corners of abutting sheet metal parts.

Another object of the present invention is to provide a body reamer tool of the character described which can be used with a variety of standard drill bits, and which can be configured to remove a variety of spot welds.

A similar object is to provide a body reamer tool of the character described which can be used to cut through plastic, aluminum, copper, brass, and mild steel alloys.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
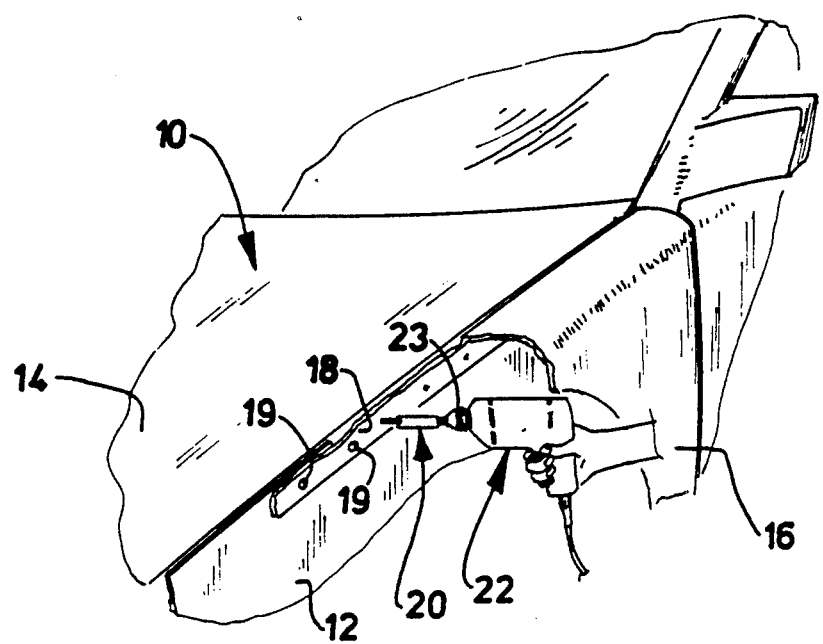
FIG. 1 is a diagrammatic view showing use of the instant AUTOMOBILE BODY REAMER TOOL.

With initial reference now to FIG. 1 of the drawings, a spot welded body portion of a typical collision damaged automobile has been generally designated by the reference numeral 10. By way of example, an inner cowling 12 is located adjacent the engine compartment and beneath the automotive hood 14. A damaged fender to be removed and replaced has been generally designated by the reference numeral 16. The fender comprises a reinforced, generally longitudinally extending rib 18 which has been welded to cowling 12 through conventional spot welds 19. The spot welds must be reamed out to remove the fender, but the inner structure must not be unnecessarily damaged so that a repair part may be easily welded in place with structural integrity preserved.

The tool of the present invention has been generally designated by the reference numeral 20. As illustrated in Figure 1, tool 20 may be driven by a conventional hand drill 22 for quick and easy manipulation once the fender 16 has been at least partially cut away or otherwise deflected so as to conveniently expose the work area. Chuck 23 conventionally removably mounts tool 20.

Figure 2:
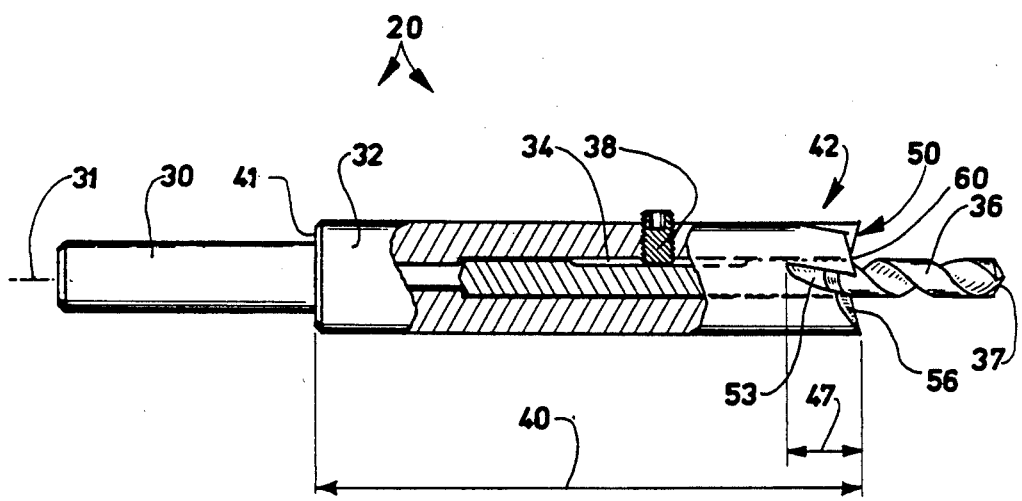
FIG. 2 is fragmentary, longitudinal view of the tool.
Figure 3:
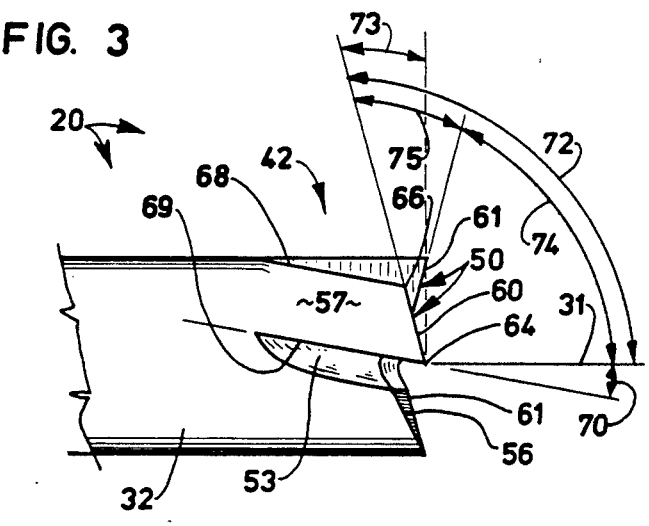
FIG. 3 is an enlarged fragmentary view of the counterbore section, with the pilot drill bit removed; and, FIG. 4 is an enlarged, elevational view, taken from a position generally to the right of FIG. 2.
Figure 4:
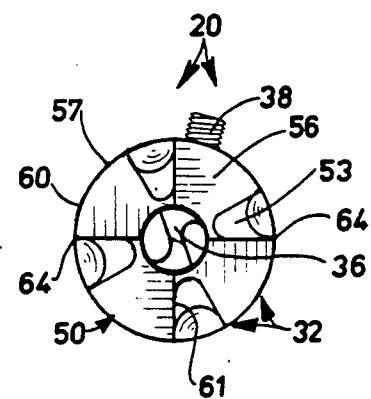

With additional reference now to FIGS. 2-4, reamer tool 20 comprises a rigid, hardened steel shank 30 which is coaxial with the longitudinal axis 31 of the tool. Shank 30 is thus adapted to be easily fitted within the conventional chuck 23 of the drill 22 (FIG. 1). Shank 30 is integral with a larger diameter counterboring section 32. The counterboring section comprises an inner, concentrically aligned, longitudinal bore 34 adapted to receive a conventional pilot twist drill bit 36. Drill bit 36 is held within the counterbore section 32 by conventional machine screw 38 disposed within a suitable threaded aperture. The length of the counterbore section 32 has been generally designated by arrow 40.

Counterbore section 32 extends from end 41 to a fluted, toothed section generally designated by the reference numeral 42. The fluted section 42 is of a reduced length, generally designated by the arrow 47 (FIG. 2). The fluted end section 42 terminates in a plurality of separate, radially spaced apart cutting teeth, generally designated by the reference numeral 50.

Teeth 50 are somewhat in the form of rigid parallelepipeds, and they spiral towards the end of the tool. They are separated by radially spaced apart, spiraled flutes 53. Each tooth 50 terminates in an outer, generally planar clearance surface 56, which, in FIG. 4, projects towards the viewer. The outermost radial surface of each tooth has been generally designated by the reference numeral 57. Surfaces 57 are actually segments of a cylinder. Faces 56 are defined between a curved, outer radial edge 60 and leading cutting edges 61. Edges 61 project outwardly from the drill center like radii (FIG. 4). The curved edges 60 of each face generally arcuately extend from a leading cutting point 64. Lagging cutting point 66 is defined by the intersection of the upper outer radial edge 68 of the tooth and the curved edge 60. The leading tooth cutting point 64 is intersected by the lower radial edge 69, the arcuate edge 60 of the face, and the radii 61.

An axial rake angle 70 of approximately ten degrees is defined between the longitudinal axis 31 of the tool and the lower, radial edge 69. An angle 72 is formed between the plane of the curved edge 60 where it intersects surface 56 and the longitudinal axis 31. Angle 72 is obtuse, ideally one hundred degrees, and preferably between ninety-five and one hundred and ten degrees. An axial clearance angle 73 is defined between the plane of the curved edge 60 and line 73A defined perpendicular to the longitudinal axis 31. Angle 74 is defined between an inner tooth edge 61 and the longitudinal axis 31. Angle 75 comprises the difference between angles 72 and 74, and ideally is thirty degrees.

In operation the outermost end 37 of the drill bit 36 first contacts the spot weld 19 to be penetrated and removed. In other words the twist drill 36 forms the pilot, so that the teeth 50 of the counterbore section thereafter engage. Continued rotation engages the leading points 64 against the metal, and the angled configuration of the leading faces displaces metal fragments away from the spot weld so that deburring occurs automatically. In other words the metal is not forced back into the spot weld, and damage from cutting is reduced.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An automobile body reamer tool for use with hand drills for drilling out spot welds during automotive body work, said tool having a longitudinal axis and comprising:

a rigid shank coaxial with said longitudinal axis and having a predetermined diameter suitable for fitting within the chuck of the hand drill for operating said tool;

a counterboring section rigidly coaxially associated with said shank having a diameter greater than said shank diameter, said counterboring section comprising a hollow interior adapted to coaxially secure a standard twist drill bit of a smaller diameter which initially engages the work piece and means for locking the drill bit within said counterboring section, and counterboring section comprising:

a substantially cylindrical body unfluted over a major portion of its length, said body comprising a first end adjoining said shank and an integral, spaced apart fluted end receiving said drill bit, said fluted end having a length approximately ten to twenty percent of the length of said body;

a plurality of radially spaced apart rotary teeth associated with said fluted end radially separated from one another by spiraling flutes for tearing out the metal in said work piece after initial penetration by said drill bit, each of said teeth comprising a clearance surface extending generally toward the work piece, said clearance surface comprising a leading outer point which initially contacts the work piece and which is colinear with a cutting edge forming an edge of said surface and projecting radially inwardly toward said longitudinal axis, said surface tapered away from said leading point;

wherein the axial rake angle is approximately ten degrees and the axial clearance angle is between ten and twenty degrees.

* * * * *